US006259579B1

(12) United States Patent
Mueller et al.

(10) Patent No.: US 6,259,579 B1
(45) Date of Patent: Jul. 10, 2001

(54) PICKER INDEXING AND MULTIMEDIA CARTRIDGE REFERENCING SPRING

(75) Inventors: Robert L. Mueller, Windsor; Paul C. Coffin, Fort Collins, both of CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/312,618

(22) Filed: May 17, 1999

(51) Int. Cl.[7] .................................................. G11B 15/68
(52) U.S. Cl. ................................................................ 360/92
(58) Field of Search .............................. 360/92; 369/36, 369/38, 178, 191; 414/282, 283, 932

(56) References Cited

U.S. PATENT DOCUMENTS

| | | | |
|---|---|---|---|
| 3,730,535 | * 5/1973 | Huber | 360/93 |
| 3,735,989 | * 5/1973 | Dattilo | 360/93 |
| 4,985,790 | 1/1991 | Kamatsu et al. | 360/96.5 |
| 5,021,902 | * 6/1991 | Ishikawa et al. | 360/92 |
| 5,596,556 | 1/1997 | Luffel et al. | 369/36 |

FOREIGN PATENT DOCUMENTS

| | | |
|---|---|---|
| 08-84725 | * 6/1998 | (EP) . |
| 0884725A2 | 6/1998 | (EP) . |
| 1310601 | 3/1969 | (GB) . |
| 13-10601 | * 3/1969 | (GB) . |
| 15-06778 | * 7/1974 | (GB) . |
| 1506778 | 7/1974 | (GB) . |
| 63-61482 | * 3/1988 | (JP) . |
| 10-11867 | * 1/1998 | (JP) . |

* cited by examiner

Primary Examiner—William Klimowicz

(57) ABSTRACT

A cartridge picker assembly may comprise a frame having a first side wall and a second side wall positioned in spaced-apart relation. A cartridge guide surface is associated with the second side wall of said frame and is substantially parallel to the second side wall. A spring assembly for biasing a data cartridge inside the cartridge picker assembly includes a flexible member mounted to the first side wall and a roller rotatably mounted on said flexible member. The roller is adapted to rollingly engage a cartridge mounted in the picker assembly.

2 Claims, 8 Drawing Sheets

US 6,259,579 B1

PICKER INDEXING AND MULTIMEDIA CARTRIDGE REFERENCING SPRING

FIELD OF THE INVENTION

This invention relates generally to data storage systems for handling and storing data cartridges, such as optical disk or magnetic tape cartridges, and more specifically to cartridge access devices for engaging and retrieving the data cartridges stored in data storage systems.

BACKGROUND

Many different types of data storage systems exist and are being used to store data cartridges at known locations and to retrieve desired data cartridges so that data may be written to or read from the data cartridges. Such data storage systems are often referred to as "juke box" data storage systems, or "autochanger" data storage systems, particularly if they can accommodate a large number of individual data cartridges.

A typical juke box data storage system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are often arranged so that they form one or more vertical stacks, although other configurations are possible. The cartridge read/write device may be located at any convenient location within the data storage system.

The data storage system may also be provided with a moveable cartridge picker assembly or simply "picker" for transporting the data cartridges between the various cartridge receiving devices, e.g., between the cartridge storage racks and the cartridge read/write devices. A typical picker may also be provided with a cartridge plunge mechanism or "thumb" assembly for engaging the various data cartridges contained in the cartridge receiving devices and for drawing them into the picker. A picker positioning system associated with the cartridge picker assembly may be used to move the cartridge picker assembly along the various cartridge receiving devices.

Data storage systems of the type described above are usually connected to a host computer system which may be used to access or store data on the data cartridges. For example, if the host computer system issues a request for data contained on a particular data cartridge, a control system associated with the data storage system will actuate the picker positioning system to move the picker assembly along the cartridge storage racks until the picker assembly is positioned adjacent the desired data cartridge. The cartridge plunge mechanism or "thumb" assembly associated with the picker assembly may then remove the data cartridge from the cartridge storage rack and draw it into the picker assembly. The picker positioning system may then be actuated to move the picker assembly to the appropriate cartridge read/write device. Once properly positioned adjacent the cartridge read/write device, the thumb assembly may insert the selected data cartridge into the cartridge read/write device so that the host computer may thereafter read data from or write data to the data cartridge. After the read/write operation is complete, the thumb assembly may be actuated to remove the data cartridge from the cartridge read/write device. The picker assembly may thereafter return the data cartridge to the appropriate location in the cartridge storage rack.

A typical cartridge plunge mechanism or "thumb" assembly is usually slidably mounted inside the picker and is provided with a thumb actuator system to move the thumb assembly toward and away from a cartridge access end of the picker. For example, if it is desired to retrieve a data cartridge from a cartridge receiving device, the thumb actuator system moves the thumb assembly toward the cartridge access end of the picker so that the thumb assembly can engage or "grab" the data cartridge. A finger assembly may be pivotally mounted on the thumb assembly to engage a notch in the data cartridge to selectively engage and disengage the data cartridge.

Thereafter, the thumb actuator system may retract the thumb assembly and engaged data cartridge into the picker. To load the data cartridge into a cartridge receiving device the thumb actuator moves the thumb assembly and data cartridge toward the cartridge access end of the picker, and inserts the data cartridge into the cartridge receiving device.

Previous tape biasing mechanisms include springs having a solid, unmoving tip, attached to the picker 12 with separate hardware such as nuts and bolts. For example, an Overland Data LibraryXpress LXB® data storage system employs a metal leaf spring having a solid plastic tip. The picker frame has a threaded stud extending from the outside of the frame which passes through a hole in the end of the leaf spring, and a washer and nut are screwed to the threaded stud to fasten the leaf spring to the outside of the picker. A solid plastic tip is connected to the leaf spring using sheet metal clips and extends into the picker through an access hole. The solid plastic tip is relatively short (e.g., the height is less than the width) and has a slight slope or bevel, allowing a specific data cartridge to pass by it into the picker.

However, solid spring tips have several disadvantages, such as being limited to a specific size and type of data cartridge. Solid spring tips also cause undesirable wear on the data cartridge and have a relatively short life span due to friction. The solid spring tip also tends to smudge or tear labels on the data cartridge, reducing legibility. Furthermore, the friction against the data cartridge and its label cause dust and debris in the picker which can cause errors.

A solid spring tip can be carefully optimized for a particular size and type of data cartridge to properly engage the cartridge and to minimize friction between the selected materials, but the picker is limited to that specific data cartridge. Changing the material of the data cartridge can lead to an undesirably high level of friction. Changing the size of the data cartridge can also increase the friction to the point of causing errors. In the extremes, the solid spring tip may either have so much friction with the data cartridge that it binds, or may wear down to the point that it does not apply sufficient force to bias the cartridge. The solid spring tip designed for a specific cartridge may also be too short to engage a thinner cartridge.

Furthermore, the construction and assembly of prior designs requires additional fasteners to connect the spring tip to the spring, or the spring to the picker, increasing the part count and complexity and reducing the potential accuracy and reliability of the finished assembly. The need for additional fasteners also increases the difficulty of assembly.

Consequently, a need exists for a cartridge referencing spring to bias multiple sizes and types of data cartridges inside a picker. In particular, a need exists for a cartridge referencing spring which is effective with different sizes and types of data cartridge and which minimizes friction with the data cartridge to reduce damage. A need further exists for a cartridge referencing spring which is simple and easy to attach to the picker, which does not require additional mounting hardware but which stays firmly affixed and positioned on the picker.

SUMMARY OF THE INVENTION

To assist in achieving the aforementioned needs, the inventors have devised a picker indexing and multimedia cartridge referencing spring, which biases a media cartridge against a guide surface in an autochanger picker. The spring allows for reliable engagement with different types and sizes of media, and improves picker indexing and positioning when inserting a cartridge into a drive or magazine. The spring may easily be attached to the picker without additional mounting hardware. The roller tip reduces friction and wear on cartridges.

A tape cartridge biasing spring assembly for an autochanger having features of the present invention may comprise a flexible member, and a roller rotatably mounted on the flexible member and resiliently displaceable therewith.

The invention may also comprise a cartridge picker assembly comprising a frame having a first side wall and a second side wall positioned in spaced-apart relation. is A cartridge guide surface is associated with the second side wall of said frame and is substantially parallel to the second side wall. A spring assembly includes a flexible member mounted to the first side wall and a roller rotatably mounted on said flexible member. The roller is adapted to rollingly engage a cartridge mounted in the picker assembly.

The invention may also comprise a cartridge picker assembly having a frame with a first side wall and a second side wall positioned in spaced-apart relation. The first side wall includes an external surface facing away from the second side wall. A plurality of guide rails are associated with the second side wall to form a guide surface facing the first side wall and being substantially parallel to the second side wall.

The cartridge picker assembly further comprises a leaf spring having a mounting end, a body portion, and a cartridge biasing end. The mounting end is attached to the external surface of the first side wall of the frame so that the body portion lies alongside the external surface of the first side wall. A spring tip having a mounting surface and two roller support arms connected perpendicularly to the mounting surface in spaced-apart relation is attached to the cartridge biasing end of the leaf spring with the mounting surface. The two roller support arms extend toward the guide surface through a rectangular opening in the first side wall of the frame. A cylindrical pin is attached between the two roller support arms with the axis of the cylindrical pin being substantially parallel with the first side wall and substantially parallel with a cartridge access end of the frame. A cylindrical roller having an axial bore sized to accept the cylindrical pin is rotatably mounted between the two roller support arms on the cylindrical pin.

The invention may also comprise a method of placing a cartridge in registration with a reference surface of an autochanger picker assembly, comprising engaging a surface of the cartridge with a roller, and applying resilient biasing force to the roller.

The invention may also comprise a cartridge registration assembly comprising a means for rollingly engaging a surface portion of the cartridge and a means for resiliently applying force to the cartridge through the means for rollingly engaging the cartridge to urge the cartridge against a reference surface.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
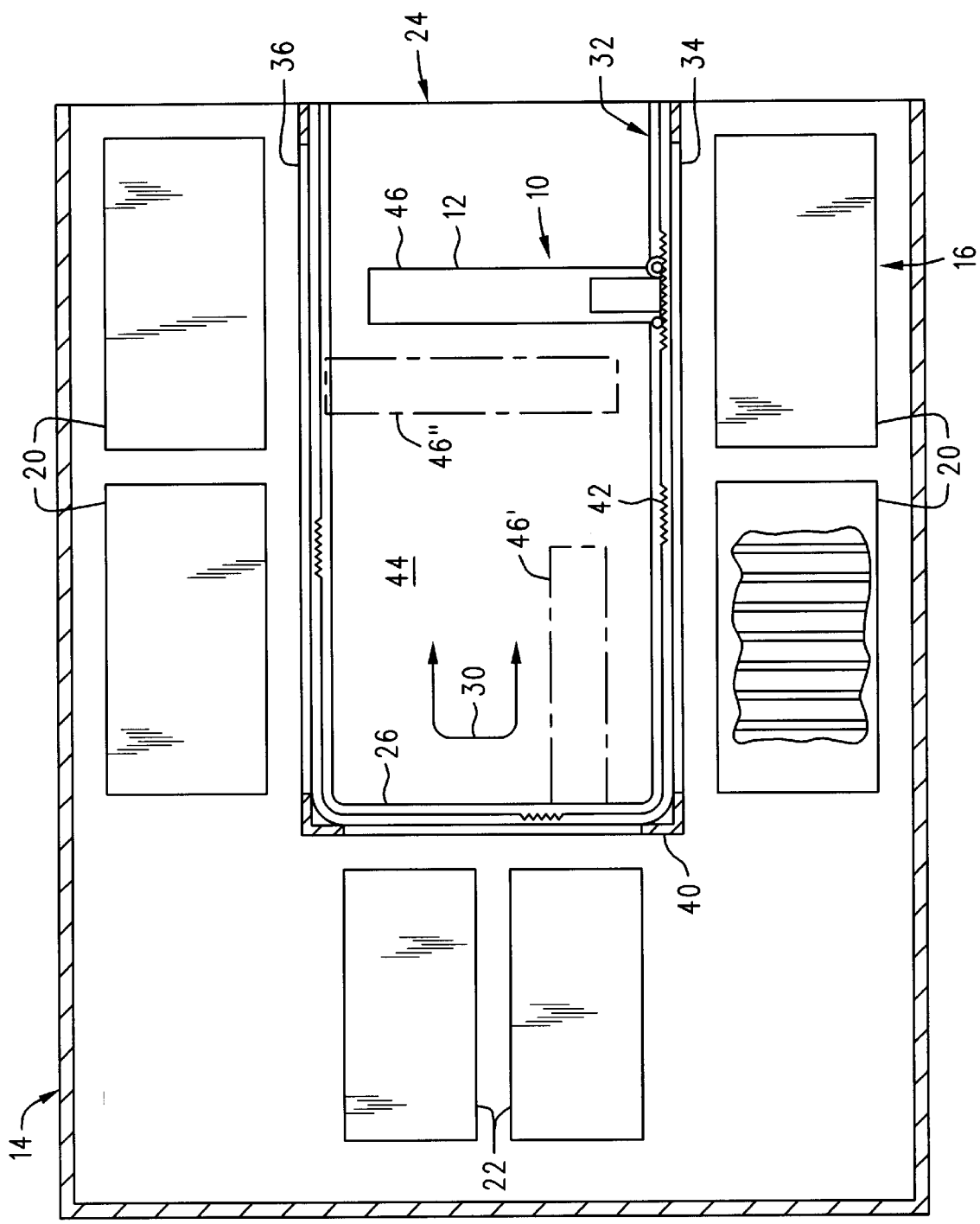
FIG. 1 is a plan view of a media access device and cartridge picker assembly as it may be used in a data storage system to access and transport data cartridges contained within the data storage system.

A cartridge picker assembly or "picker" 12 having a picker indexing and multimedia cartridge referencing spring 10 is shown in FIG. 1 as it could be used in a "juke box" data storage system 14 to transfer data cartridges 16 between one or more cartridge receiving devices, such as one or more cartridge storage racks or magazines 20 and one or more cartridge read/write devices 22. The picker 12 may be moved within the juke box 14 by a picker positioning system 32 to various positions adjacent storage magazines 20 and cartridge read/write devices 22. The picker 12 includes a thumb assembly 80 which may move back and forth inside the picker 12 along an X axis, toward and away from a cartridge access end 82. The thumb assembly 80 is adapted with a finger assembly 84 for engaging a data cartridge 16. When the picker 12 has been positioned adjacent a data cartridge 16 in a cartridge receiving device, the thumb assembly 80 may be extended toward the data cartridge 16 until the finger assembly 84 engages the cartridge 16. The thumb assembly 80 may then be retracted, drawing the data cartridge 16 into an interior chamber 56 in the picker 12. The picker 12 may then be moved inside the data storage system 14 to another cartridge receiving device (e.g., 20 and 22), and the thumb assembly 80 may push the data cartridge 16 out of the interior chamber 56 into the cartridge receiving device.

The finger assembly 84, thumb assembly 80, and picker 12 must be positioned or indexed precisely in front of a cartridge receiving device 20 and 22 during cartridge retrieval in order for the finger assembly 84 to reliably engage with the data cartridge 16. The thumb assembly 80 is precisely positioned in the picker 12 by a guide track 86, facilitating cartridge retrieval.

Figure 2:
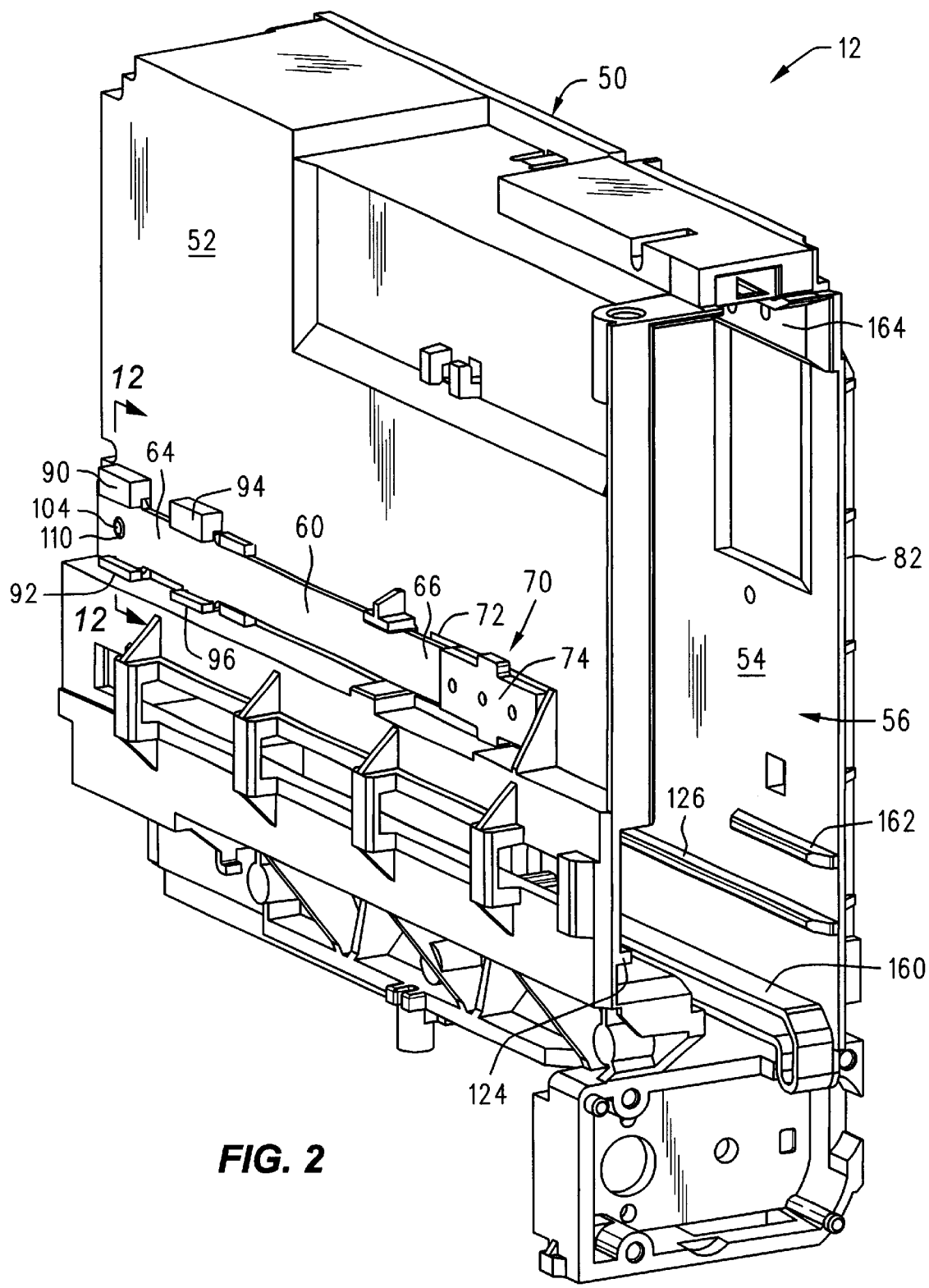
FIG. 2 is a perspective view of the cartridge picker assembly having a picker indexing and multimedia cartridge referencing spring.
Figure 7:
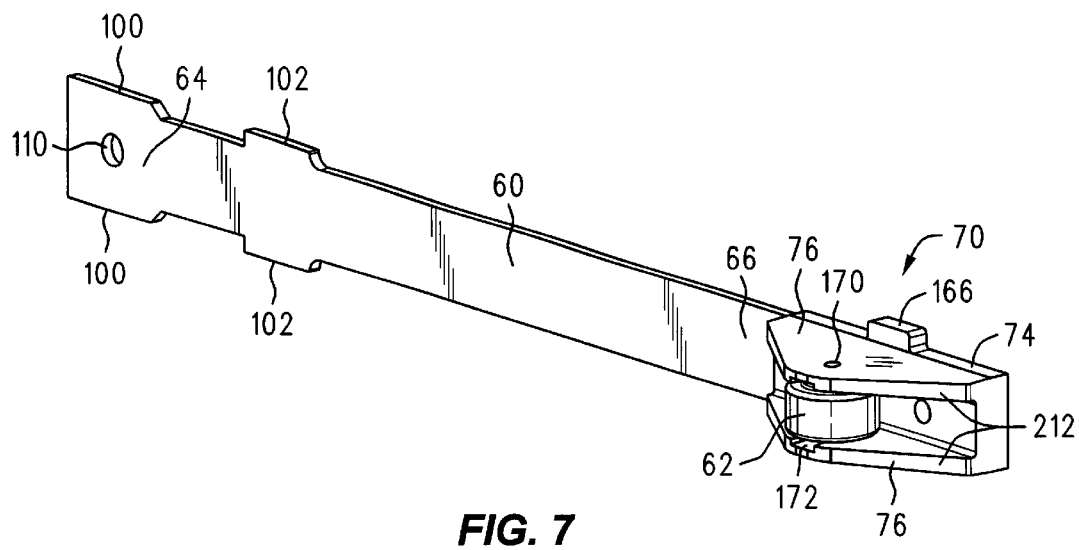
FIG. 7 is a perspective view of a cartridge referencing spring.
Figure 8:
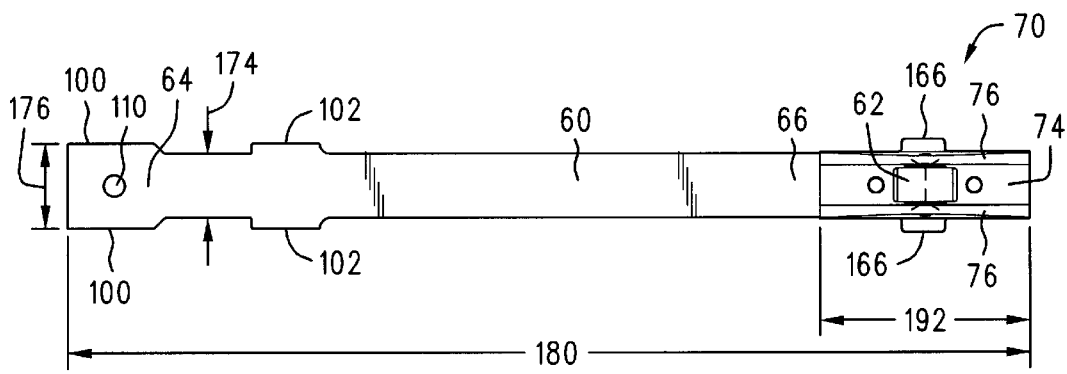
FIG. 8 is a top view of the cartridge referencing spring of FIG. 7.
Figure 9:
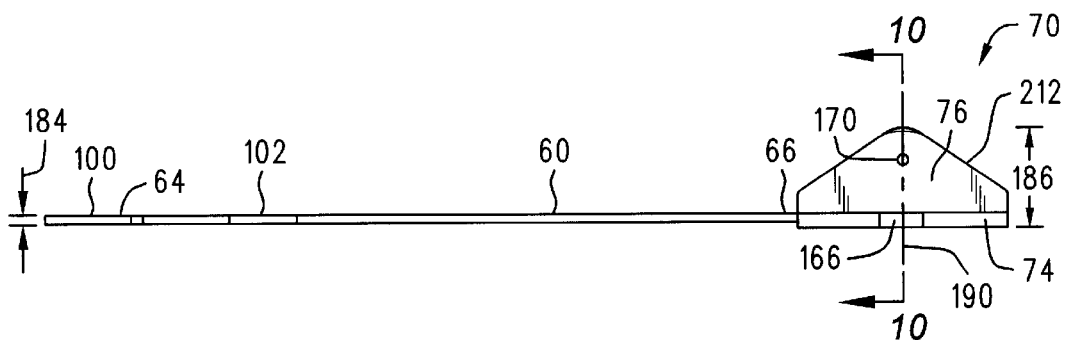
FIG. 9 is a side view of the cartridge referencing spring of FIG. 7.
Figure 10:
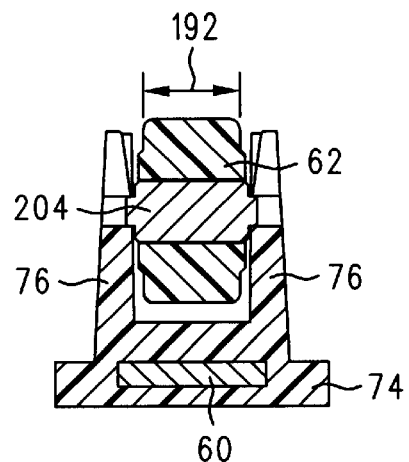
FIG. 10 is a cross-sectional end view of the cartridge referencing spring of FIG. 9 taken along line 190.

Similarly, a data cartridge 16 in the picker 12 must be positioned precisely in front of a cartridge receiving device 20 and 22 during cartridge insertion to reliably insert the cartridge 16. The picker indexing and multimedia cartridge referencing spring 10 as seen in FIGS. 2 and 7 may be mounted to the picker 12 to bias a data cartridge 16 against a side wall 54 of the picker 12, thereby precisely positioning the cartridge 16 inside the picker 12.

The picker indexing and multimedia cartridge referencing spring 10 thus aids in picker indexing, or positioning, increasing reliability. The picker indexing and multimedia cartridge referencing spring 10 also allows various types and sizes of data cartridge 16 to be used, such as various magnetic or optical tapes or disks. In a preferred embodiment, the juke box 14 may employ multiple digital linear tape (DLT) cartridges such as model number DLTtape IV, available from Quantum Co. of Milpitas, Calif. However, the cartridge referencing spring 10 allows the use of media of varying widths.

The juke box 14 may be a multimedia device, allowing access to varying types or sizes of media in one device, or the juke box 14 may use only one type of media without being specifically designed for use with only that type of media. The cartridge referencing spring 10 biases a data cartridge 16 against a reference surface in the picker 12 so that the position of the cartridge 16 is precisely known. This prevents a narrow data cartridge 16 from floating to an unknown position within the wider interior chamber 56 in the picker 12, where it could bind against the magazine 20 or cartridge read/write device 22 during insertion.

The cartridge referencing spring 10 may comprise a flexible member 60 which is mounted at a first end 64 to the frame 50 of the picker 12. A spring tip 70 is mounted at a second end 66 of the flexible member 60. The spring tip may comprise a mounting surface 74 which attaches to the flexible member 60, and two support arms 76 extending from the mounting surface 74 in parallel, spaced-apart relation. A roller 62 may be mounted between the two support arms 76 to roll against the side of a data cartridge 16 when it is moving either in a direction in 122 or out 120 of the picker 12, in order to exert a biasing force against the data cartridge 16 while minimizing friction between the cartridge referencing spring 10 and the cartridge 16.

The cartridge referencing spring 10 may be mounted at the first end 64 to an outside surface of the side 52 of the picker frame assembly 50. The cartridge referencing spring 10 may be attached to the picker 12 with 'L' shaped mounting brackets 90, 92, 94, and 96, which wrap over wings 100 and 102 extending from the flexible member 60.

The cartridge referencing spring 10 may be further fixed in place against the side 52 of the picker frame 50 by a mounting post 104 on the frame 50 which engages in a hole 110 in the first end 64 of the cartridge referencing spring 10. The mounting post 104 prevents the cartridge referencing spring 10 from sliding out from under the mounting brackets 90, 92, 94, and 96. The mounting post 104 may be placed on an elastic mounting arm 106, allowing the mounting post 104 to be pressed below the surface of the picker side 52 until the hole 110 in the cartridge referencing spring 10 moves over the post 104, at which point the elastic mounting arm 106 will return to its normal position and the mounting post 104 will slide into the hole 110. To mount the cartridge referencing spring 10 to the picker 12, the cartridge referencing spring 10 is placed against the side 52 with the wings 100 and 102 alongside the mounting brackets 90, 92, 94, and 96. The cartridge referencing spring 10 is then slid along the picker side 52 so that the wings 100 and 102 slide under the mounting brackets 90, 92, 94, and 96, and the mounting post 106 slides into the hole 110 to prevent further sideways motion.

A portion of the spring tip 70 extends through a hole 72 in the first side 52 of the picker frame 50, particularly the two support arms 76 and the roller 62. The bulk of the cartridge referencing spring 10 thus remains on the outside of the picker 12, reducing overall size of the picker 12, while the spring tip 70 extends into the interior chamber 56 to engage a data cartridge 16.

The roller 62 may comprise any type of rolling member to rotate as the data cartridge 16 passes by it, thereby reducing friction. For example, the roller 62 may comprise a sphere, either held between two support arms 76 or held in a support ring (not shown) like a ball point in a pen. In a preferred embodiment, the roller 62 comprises a cylinder supported between the two support arms 76.

The cartridge referencing spring 10 provides substantial benefits. The cartridge referencing spring 10 increases reliability of the juke box 14 by reducing the likelihood of misaligned data cartridges 16 during cartridge insertion operations. The picker indexing or positioning is greatly improved, allowing cartridge receiving devices 20 and 22 to have openings with lower tolerances, sized nearly equal to the width of the data cartridges 16.

The cartridge referencing spring 10 also enables multimedia juke boxes 14, or the use of a juke box 14 with different types of media cartridges without adapting the picker 12.

The cartridge referencing spring 10 also reduces friction between the spring 10 and the data cartridges 16, reducing damage and wear to the cartridges 16 and reducing the likelihood of binding. This may also lower the power requirements for thumb assembly drive motors.

Having briefly described the cartridge referencing spring 10, as well as some of its more significant features and advantages, the various embodiments of the cartridge referencing spring 10 according to the present invention will now be described in detail. However, before proceeding with the description, it should be noted that the cartridge referencing spring 10 according to the present invention may be utilized in any of a wide range of cartridge engaging assemblies in any of a wide variety of data storage systems now known or that may be developed in the future. Accordingly, the present invention should not be regarded as limited to the particular data storage system 14 and cartridge picker assembly 12 shown and described herein.

With the foregoing considerations in mind, one embodiment of a cartridge referencing spring 10 is shown and described herein as it may be used in a cartridge picker assembly 12. The cartridge picker assembly 12 may, in turn, be used in a portion of a "juke box" data storage system 14. In one preferred embodiment, the juke box data storage system 14 may comprise a data storage system of the type shown and described in U.S. patent application Ser. No. 09/1045,134, filed Mar. 20, 1998, entitled "Multi-Plane Translating Cartridge Handling System," which is incorporated herein by reference for all that it discloses. Alternatively, the data storage system 14 may be of the type shown and described in U.S. Pat. No. 5,596,556, entitled "Linear Displacement and Support Apparatus for use in a Cartridge Handling System," which is also incorporated herein by reference for all that it discloses. The data storage system 14 may also be of the type shown and described in U.S. patent application Ser. No. 09/137,350, filed Aug. 20, 1998, entitled "Modular Data Storage System," which is incorporated herein by reference for all that it discloses.

Referring now primarily to FIG. 1, the data storage system 14 shown and described in U.S. patent application Ser. No. 09/045,134 referred to above may comprise a generally rectangularly shaped frame or chassis assembly 24 having a pair of opposed side portions 34 and 36 and an end portion 40 around which are positioned various cartridge receiving devices. More specifically, a pair of cartridge storage racks or magazines 20 may be positioned adjacent each opposed side portion 34 and 36 of the frame or chassis assembly 24, whereas a pair of cartridge read/write devices 22 may be positioned adjacent the end portion 40 of the frame assembly 24. Accordingly, the various cartridge receiving devices (e.g., the cartridge storage racks or magazines 20 and the cartridge read/write devices 22) define a generally U-shaped configuration.

A picker positioning system 32 may be used to move the cartridge picker assembly 12 along the U-shaped guide track 26. For example, in the embodiment shown and described herein, the picker positioning system 32 may move the cartridge picker assembly 12 between a first position 46 adjacent the first side portion 34 of the frame assembly 24, a second position 46' adjacent the end portion 40 of frame assembly 24, and a third position 46" adjacent the second side portion 36 of frame assembly 24.

The picker positioning system 32 may comprise a rack and pinion drive system having a U-shaped gear rack 42 mounted to the lower plate 44 of frame assembly 24 at a position adjacent the U-shaped guide track 26. The cartridge picker assembly 12 may be provided with a lower pinion gear 112 (FIG. 6) sized and positioned so that it will engage the lower U-shaped gear rack 42 provided on the lower plate 44. Similarly, the cartridge picker assembly 12 may also be provided with an upper pinion gear 114 sized and positioned so that it will engage an upper U-shaped gear rack provided on an upper plate (not shown). A drive pinion actuator system 116 mounted to the cartridge picker assembly 12 may be used to drive the lower and upper pinion gears 112 and 114, thereby allowing the picker assembly 12 to be moved along the U-shaped path 30.

Figure 5:
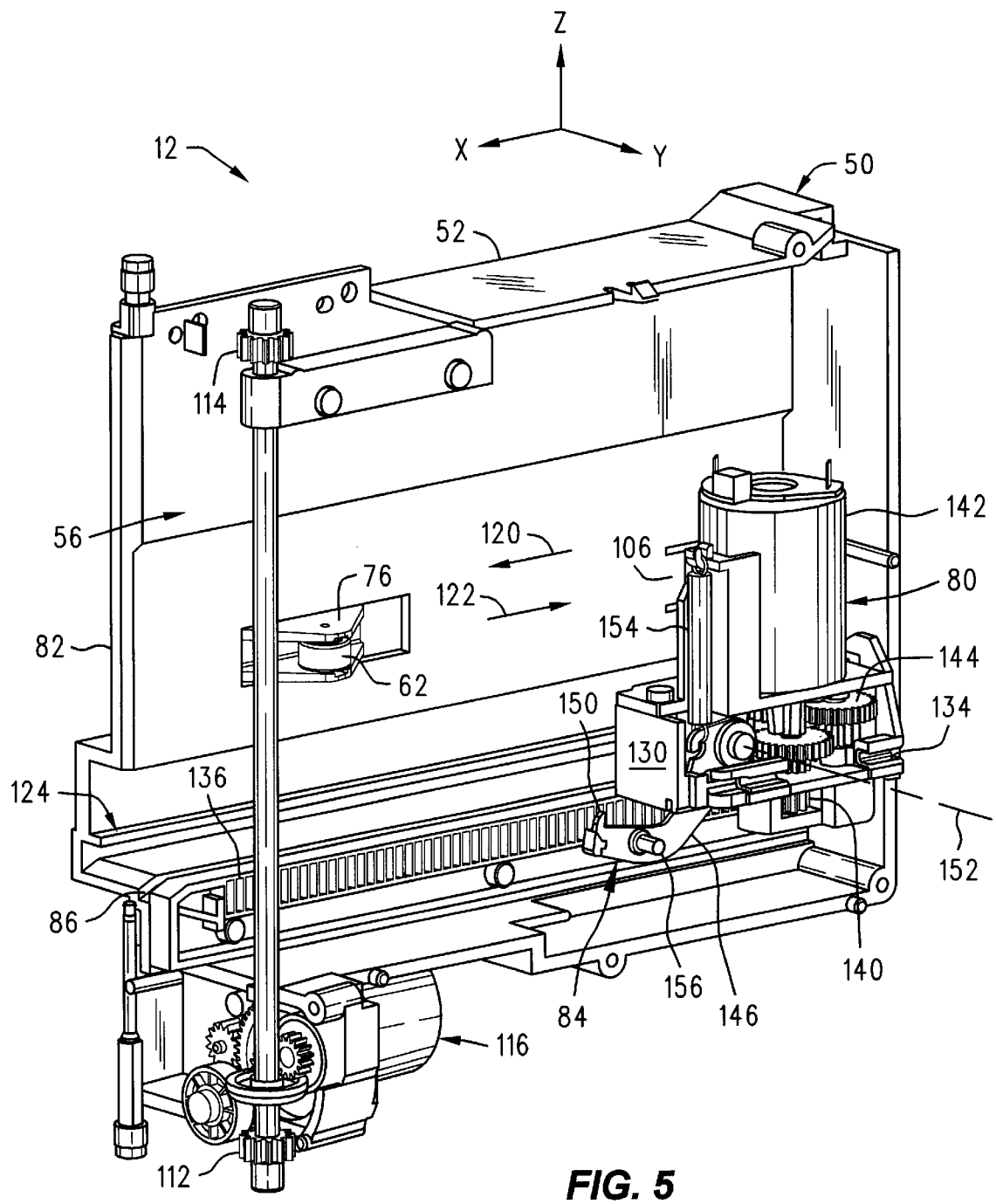
FIG. 5 is a perspective view of the inner left side of the cartridge picker assembly showing the thumb and finger assemblies.
Figure 6:
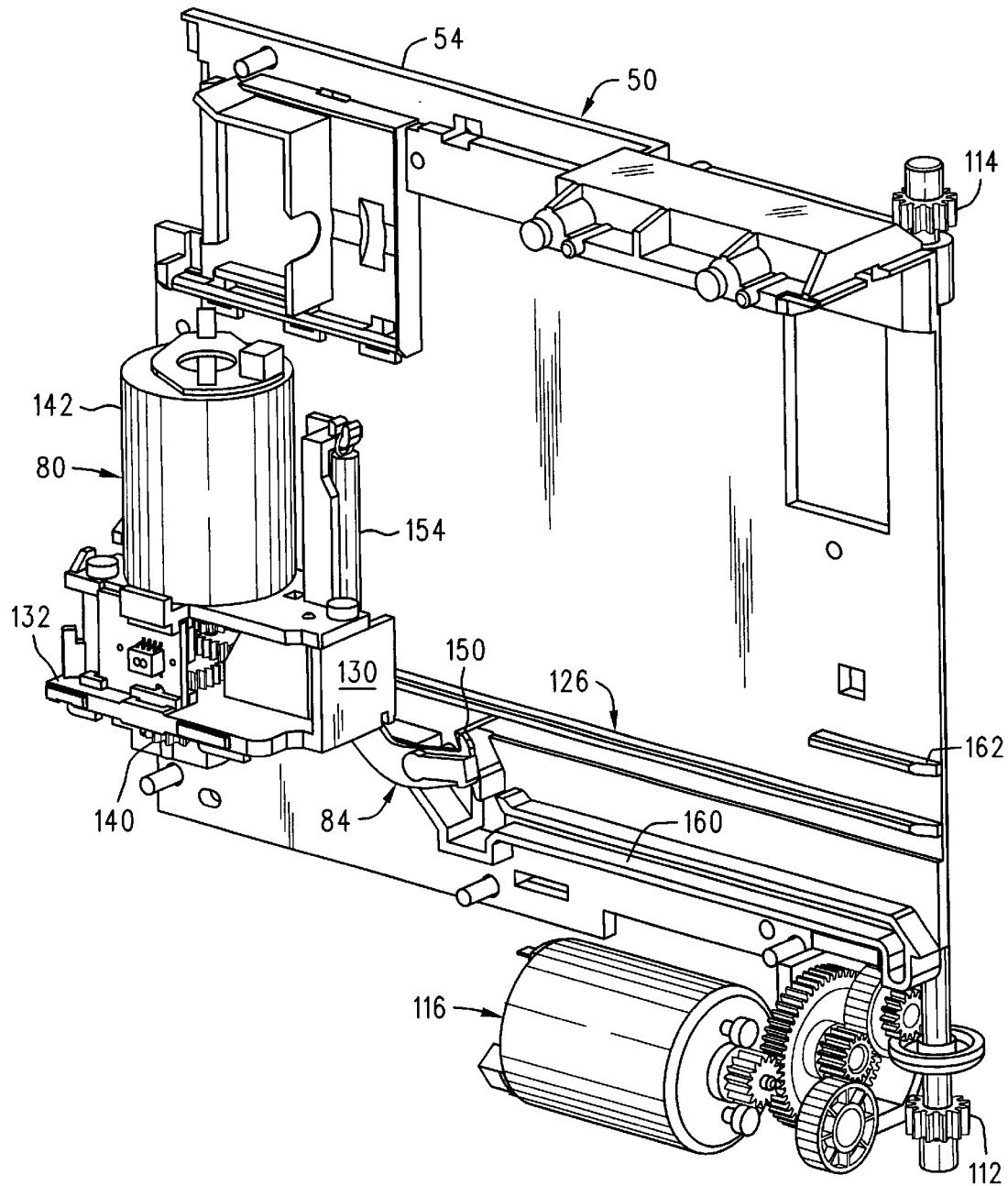
FIG. 6 is a perspective view of the inner right side of the cartridge picker assembly showing the thumb and finger assemblies.

The details of the cartridge picker assembly 12 that may be utilized in one preferred embodiment of the present invention are best seen in FIGS. 2, 5, and 6. Essentially, the cartridge picker assembly 12 may include a picker frame assembly 50 having a first side wall or member 52 and a second side wall or member 54. The two side members 52 and 54 define an interior chamber or cavity 56 of sufficient size to receive a data cartridge 16. The thumb assembly 80 is slidably mounted to the frame assembly 50 so that the thumb assembly 80 may be moved along an X axis toward and away from the cartridge access end 82 of frame assembly 50, i.e., generally in the directions of arrows 120 and 122, respectively. (See FIG. 5)

The thumb assembly 80 may be mounted on first and second elongate guide rails 124 and 126 that are provided on the first and second sides 52 and 54 of the picker frame assembly 50. (See FIGS. 5 and 6) The main body portion 130 of the thumb assembly 80 may include a first flange member 132 sized and positioned to engage the first elongate guide rail 124. The main body portion 130 of the thumb assembly 80 may also include a second or C-shaped flange member 134 adapted to engage the second elongate guide rail 126. The thumb assembly 80 is thereby guided and supported as it is moved in the cartridge picker assembly 12 toward and away from the cartridge access end 82.

The various components just described may be made from any of a wide range of materials, such as metals or plastics, suitable for the intended application. For example, in one preferred embodiment, the first and second side members 52 and 54 comprising the picker frame assembly 50 are molded from a polycarbonate plastic material. Accordingly, the various components and features contained therein, e.g., the guide rails 124 and 126 may be provided as integral components of the respective side members 52 and 54. Alternatively, the first and second side members 52 and 54 comprising the picker frame assembly 50 may be made from other materials, in which case the various components and features of the side members 52 and 54 may comprise integral components or separate elements, depending on the particular design and material to be utilized.

The main body portion 130 of the thumb assembly 80 may also be made from any of a wide range of materials suitable for the intended application. For example, in the embodiment shown and described herein, the main body portion 130 of thumb assembly 80 is made from nylon with a small amount of Teflon® added (e.g., about 15% by weight) as a friction modifier, although other materials could also be used.

The thumb assembly 80 may be moved toward and away from the cartridge access end 82 of the cartridge picker assembly 12 by any of a wide range of actuator systems. By way of example, in one preferred embodiment, the thumb assembly 80 may be moved by a rack and pinion drive assembly of the type shown and described in U.S. patent application Ser. No. 09/045,558, filed Mar. 20, 1998, and entitled "Cartridge Picker Assembly with Rack Drive Thumb Actuator System," which is incorporated herein by reference for all that it discloses. Alternatively, other types of thumb actuator systems may be used.

The rack and pinion drive system utilized in one preferred embodiment of the present invention and shown and described in U.S. patent application Ser. No. 09/045,558, referred to above, is best seen in FIGS. 5 and 6 and may comprise an elongate gear rack 136 that is affixed to the first side member 52 of the picker frame assembly 50. The main body portion 130 of the thumb assembly 80 may be provided with a pinion gear 140 positioned so that it engages the gear rack 136. The pinion gear 140 is caused to rotate by a drive system which, in one preferred embodiment, includes a motor 142 and a gear reduction system 144. The motor 142 may be mounted to the main body portion 130 of the thumb assembly 80 and is operatively associated with the gear reduction system 144 so that the motor 142 rotates the pinion gear 140 to extend and retract the thumb assembly 80.

The motor 142 may comprise any of a wide range of motors suitable for the intended application. In one preferred embodiment, the motor 142 comprises a permanent magnet D.C. motor, such as model no. RS-385PH, available from Mobuchi Co. of China, although other types may also be used.

The gear reduction system 144 may comprise a conventional gear reduction system utilizing a plurality of spur gears to provide a reduction ratio sufficient to allow the motor 142 to extend and retract the thumb assembly 80 at an appropriate speed and with sufficient force to withdraw and insert the data cartridge 16 into the selected cartridge receiving device. In one preferred embodiment, the gear reduction system 142 provides a reduction ratio of about 11.5:1, although other ratios may be used depending on, for example, the speed and torque characteristics of the particular motor 142 that is selected. The various spur gears comprising the gear reduction system 144 may be made from any convenient material, such as metal or plastic, suitable for the intended application. By way of example, in one preferred embodiment, the various spur gears comprising the gear reduction system 144 are made from brass and stainless steel. Alternatively, the gear reduction system could utilize other types of gears, such as worm gears, to provide the desired reduction.

The thumb assembly 80 may also be provided with any of a wide variety of finger assemblies well-known in the art for engaging data cartridges, such as data cartridge 16. Accordingly, the present invention should not be regarded as limited to any particular type of finger assembly. By way of example, in one preferred embodiment, the finger assembly 84 may comprise an arm 146 having a hook portion 150, as best seen in FIG. 5. Hook portion 150 of arm 146 is configured to engage a notch (not shown) provided on the data cartridge 16. The arm 146 is pivotally mounted to the main body 130 of the thumb assembly 80 so that the arm 146 is free to pivot about pivot axis 152. See FIG. 5. A spring 154 may be used to bias the arm 146. The arm 146 may be provided with a pin 156 (FIG. 6) which engages a guide track 160 provided on the second side 54 of frame assembly 50 (FIG. 6). The guide track 160 actuates the arm 146 as the thumb assembly 80 moves toward and away from the cartridge access end 82, thus moving the hook 150 in an out of the notch in a data cassette 16 to engage or disengage it. However, since finger and track systems, such as finger assembly 84 and guide track 160, for engaging cartridges are well-known in the art and could be easily provided by persons having ordinary skill in the art after having become familiar with the teachings of the present invention, the particular finger assembly 84 and guide track 160 used in one preferred embodiment of the present invention will not be described in greater detail herein.

The foregoing description of the data storage system 14 and related components (e.g., the cartridge picker assembly 12, thumb assembly 80, finger assembly 84 and picker positioning system 32) is provided in order to better understand one environment in which the cartridge referencing spring 10 according to the present invention may be used. However, as was mentioned above, it should be understood that the cartridge referencing spring 10 may be used in any of a wide range of other types of data storage systems or other similar devices having moveable internal components. Consequently, the present invention should not be regarded as limited to the particular data storage system 14 shown and described herein.

A picker indexing and multimedia cartridge referencing spring 10 for biasing data cartridges 16 against a reference surface 126, 162, and 164 in a picker 12 may comprise an elongated elastic arm 60 with a roller 62 mounted thereon. The roller 62 is preferably mounted to a tip member 70 on the elastic arm 60. The elastic arm 60 may be attached at a first end 64 to a first side wall 52 of the picker frame 50, and the tip member 70 supporting the roller 62 is attached at a second end 66 of the arm 60.

In a preferred embodiment, the elongated elastic arm 60 comprises a leaf spring which may be fabricated from full hard 301 stainless steel having a thickness 184 of about 0.05 inches. The tip member 70 may be molded over the second end 66 of the elongated elastic arm 60 from a plastic material. For example, the tip member 70 may be molded from nylon having a small amount of PTFE and carbon fiber added (e.g., about 15% PTFE and about 30% carbon fiber by weight). To securely mold the tip member 70 over the second end 66 of the elongated elastic arm 60, the second end 66 may have one or more holes drilled therein (not shown), notches cut into the sides, or other such features allowing the tip material to flow in during molding. In a preferred embodiment, the cartridge referencing spring 10 has a length 180 of about 137.9 mm and a width 174 of about 9.9 mm, and the spring tip 70 has a length 182 of about 30.8 mm and a height 186 of about 11.8 mm.

The spring tip 70 comprises a mounting surface 74 which is the portion molded over the second end 66 of the elongated elastic arm 60. Two support arms 76 extend substantially perpendicularly from the mounting surface 74 in a parallel, spaced-apart manner, and the roller 62 is mounted between the support arms 76.

In a preferred embodiment, the roller 62 comprises a cylindrical roller. The roller 62 may also comprise any device which may be rollingly mounted to the spring tip 70. For example, a spherical roller may be mounted between the two support arms 76, or may be mounted to the spring tip 70 in a mounting ring, similar to that in use in a roller ball writing pen.

Figure 11:
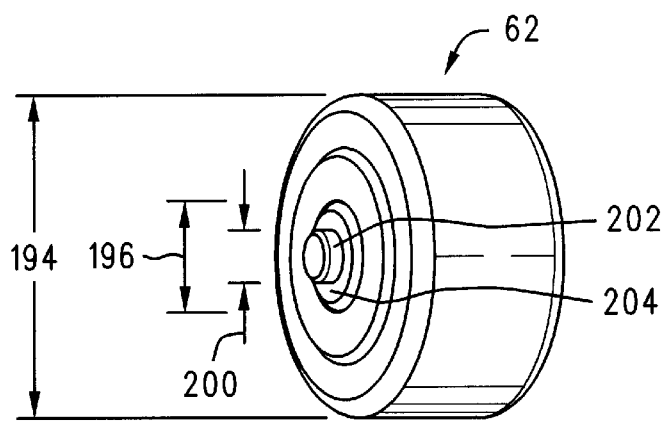
FIG. 11 is a perspective view of a roller for a cartridge referencing spring.
Figure 12:
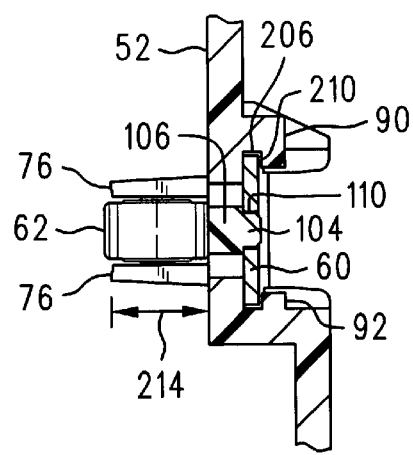
FIG. 12 is a partial cross-sectional view of the cartridge referencing spring and mounting post.

The roller 62, as best seen in FIG. 11, preferably has a width 192 of about 5.4 mm and a diameter 194 of about 9.4 mm. The cylindrical roller 62 of the preferred embodiment may be supported between the two support arms 76 on a cylindrical pin 204. An axial bore in the cylindrical roller 62 is sized to accept the cylindrical pin 204. The pin 204 has a support tip 202 at each end, which engage in pin support holes 170 in the support arms 76 on the spring tip 70. The pin 204 preferably has a diameter 196 of about 3.2 mm, and a length of about 6.6 mm. The pin support tips 202 may have a diameter 200 of about 1.5 mm, sized to engage firmly within the pin support holes 170. Because the pin 204 engages firmly with the two support arms 76, the only sliding interface is that between the pin 204 and the roller 62, as the roller 62 rotates around the pin 204. The sliding interface between the roller 62 and the pin 204 should therefore have a low coefficient of friction to minimize wear. The roller 62 is preferably made of Delrin AF, available from G.E., or Acetal with a Teflon® additive. The pin 204 is preferably made of 303 stainless steel.

To attach the roller 62 to the spring tip 70, the pin 204 is first inserted into the axial bore in the roller 62, the axial bore being sized to accept the pin 204 substantially without rattling or binding. The roller 62 is then pressed between the support arms 76 so that the support tips 202 of the pin 204 slide down along beveled pin slots 172 in the support arms 76. As the pin support tips 202 slide down the pin slots 172, the support arms 76 are forced slightly apart, allowing the roller 62 and pin 204 to slide between the support arms 76. As the roller 62 and pin 204 are pressed down between the support arms 76, the pin support tips 202 will move over the pin holes 170 and snap into the pin holes 170, allowing the support arms 76 to move back toward each other to firmly support the roller 62 and pin 204. The support arms 76 are spaced apart by the pin 204, allowing the roller 62 to turn between the support arms 76 with a minimum of friction.

The roller 62 is not limited to the mounting system described above, but may be rollingly mounted to the elongated elastic arm 60 in any suitable manner.

The spring tip 70 may also comprise two tabs 166 extending from the mounting surface 74 in a substantially parallel manner. When the roller 62 is passed through the spring access hole 72 in the first side wall 52 of the cartridge picker assembly frame 50, the two tabs 166 engage with the first side wall 52, preventing the spring tip 70 from extending too far into the interior chamber 56 of the picker 12.

The cartridge referencing spring 10 of a preferred embodiment may be connected to the cartridge picker assembly frame 50 without separate mounting hardware.

The cartridge referencing spring 10 may comprise mounting wing portions 100 and 102 which increase the width 176 of the elongated elastic arm 60 at the first end 64 to about 12.7 mm. Two relatively short wing portions 100 and 102 may be used for increased support and ease of assembly. Alternatively, a single wing portion, either short or long, may be used as desired.

The first side wall 52 includes 'L' shaped mounting brackets 90, 92, 94, and 96, which have extension members (e.g., 206) extending from the first side wall 52 in a substantially perpendicular manner and having a height substantially equal to the thickness 184 of the elongated elastic arm 60. Overhang members (e.g., 210) protrude from the extension members (e.g., 206), substantially in parallel with the first side wall 52, in order to extend over the elongated elastic arm 60 to hold it against the first side wall 52.

The first mounting brackets 90 and 92 are located so as to be adjacent to the first wing portion 100 of the cartridge referencing spring 10, while the second mounting brackets 94 and 96 are located so as to be adjacent to the second wing portion 102 of the cartridge referencing spring 10. The mounting brackets 90–96 are spaced to accept the elongated elastic arm 60 firmly between them to prevent shifting of the arm 60.

Figure 4:
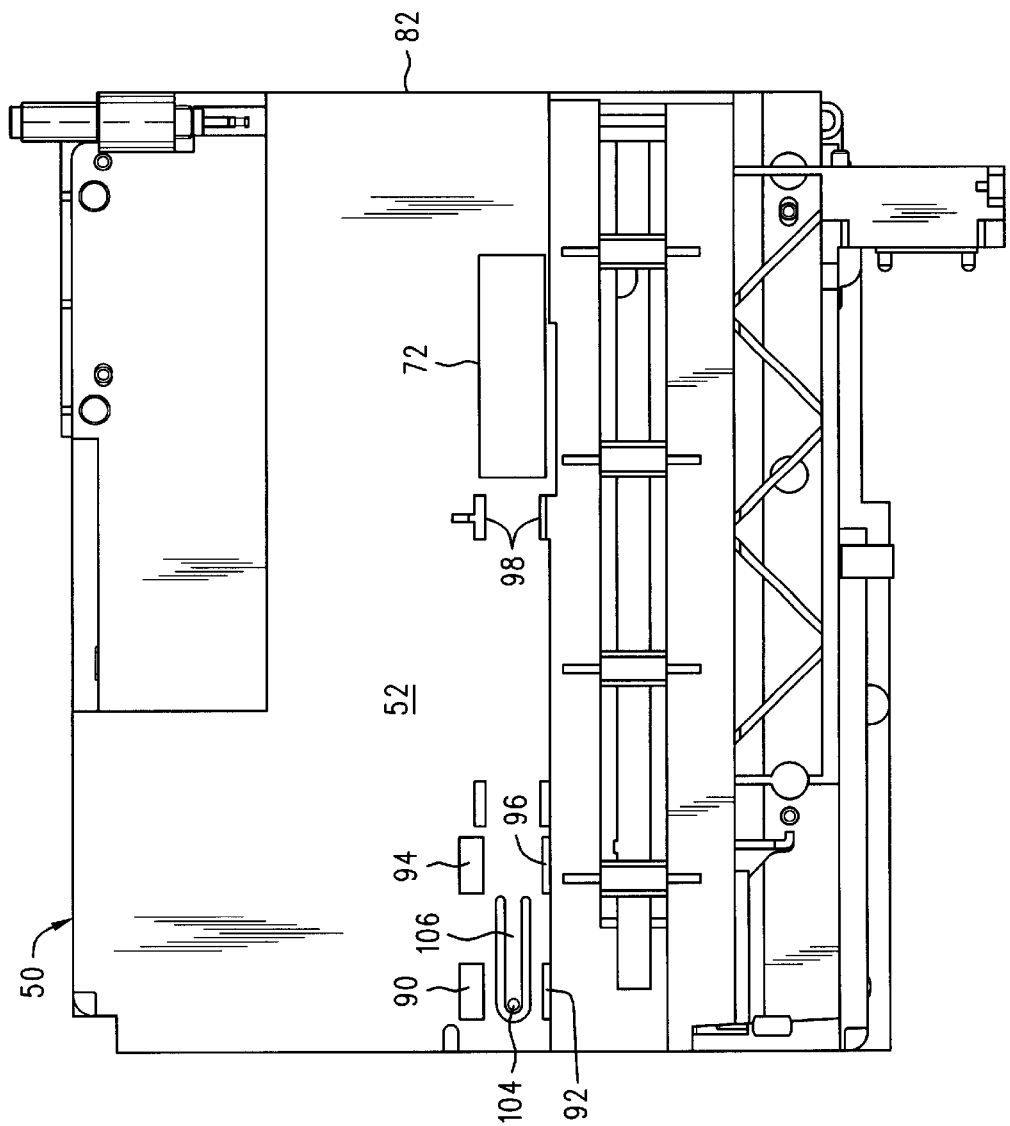
FIG. 4 is a side view of the cartridge picker assembly of FIG. 2.

The first side wall 52 may also comprise an elastic mounting arm 106, having a mounting post 104 thereon extending away from the picker 12, as best seen in FIG. 4. The mounting post 104 is sized to engage in a mounting hole 110 in the first end 64 of the elongated elastic arm 60.

To attach the cartridge referencing spring 10 to the cartridge picker assembly frame 50, the cartridge referencing spring 10 is first placed against the outside surface of the first side wall 52 so that the spring tip 70 partially extends through the spring access hole 72 into the interior chamber 56. The first end wing 100 should lie between the first mounting brackets 90 and 92 and the second mounting brackets 94 and 96, while the second end wing 102 lies alongside the second mounting brackets 94 and 96. As the cartridge referencing spring 10 is in this position and is pressed against the first side wall 52, the first end 64 of the elongated elastic arm 60 presses against the mounting post 104, causing the elastic mounting arm 106 to deflect into the picker 12 so that the top of the elastic mounting arm 106 is level with the surface of the first side wall 52.

The cartridge referencing spring 10 is then slid in direction 122 away from the cartridge access end 82 of the picker 12, causing the first wing portion 100 to slide between and under the first mounting brackets 90 and 92, and the second wing portion 102 to slide between and under the second mounting brackets 94 and 96, until the mounting post 104 snaps into the mounting hole 110 on the elongated elastic arm 60. The cartridge referencing spring 10 is thus prevented by the mounting post 104 from sliding along the X axis (FIG. 5), prevented by the extension members (e.g., 206) of the mounting brackets 90–96 from moving up or down along the Z axis, and prevented by the overhang members (e.g., 210) from moving away from the first side wall 52 connection system.

To further prevent sideways movement of the cartridge referencing spring 10, positioning posts 98 may extend from the first side wall 52, bracketing the sides of the elongated elastic arm 60 near a midpoint.

The mounting brackets 90–96, elastic mounting arm 106 and mounting post 104, and the positioning posts 98 are preferably molded integrally with the first side wall 52. Alternatively, they may be individual elements which are attached to the first side wall 52.

In a preferred embodiment, the elastic arm 60 remains outside of the interior cavity 56 of the picker 12, while a portion of the tip member 70 and the roller 62 extend into the cavity 56 through a rectangular access opening or hole 72 in the first side wall 52. This allows the roller 62 to bias a data cartridge 16 toward the second side wall 54 inside the picker 12, while reducing the overall size of the picker 12 by placing the cartridge referencing spring 10 and its mounting brackets (e.g., 90 and 94) outside the picker 12.

The cartridge referencing spring 10 biases a data cartridge 16 against a reference surface on the second side wall 54 of the picker 12. The reference surface in a preferred embodiment comprises the second guide rail 126 near the bottom of the second side wall 54 and an upper reference surface 164 near the top of the second side wall 54. An additional guide rail 162 may extend from the second side wall 54 between the second guide rail 126 and the upper reference surface 164, further allowing varying shapes and sizes of media to be used in the picker 12. The reference surface may also comprise the surface of the second side wall 54, or any other suitable reference surface for supporting a data cartridge 16 in the proper orientation and having a suitably low coefficient of friction with the data cartridge 16.

During operation of the picker 12, the cartridge referencing spring 10 biases the data cartridge 16 against the reference surface 126, 162, and 164 on the second side wall 54. As a data cartridge 16 is pulled into the interior chamber 56 by the thumb assembly 80, the cartridge 16 contacts a sloped region 212 on the front of the spring tip 70, causing the spring tip 70 to move away from the second side wall 54 by flexing the elongated elastic arm 60 away from the picker 12. As the data cartridge 16 continues to move into the picker 12, the data cartridge 16 slides along the sloped region 212 of the spring tip 70 until the roller 62 is resting against the side of the data cartridge, pressing it against the reference surface 126, 162, and 164.

Figure 3:
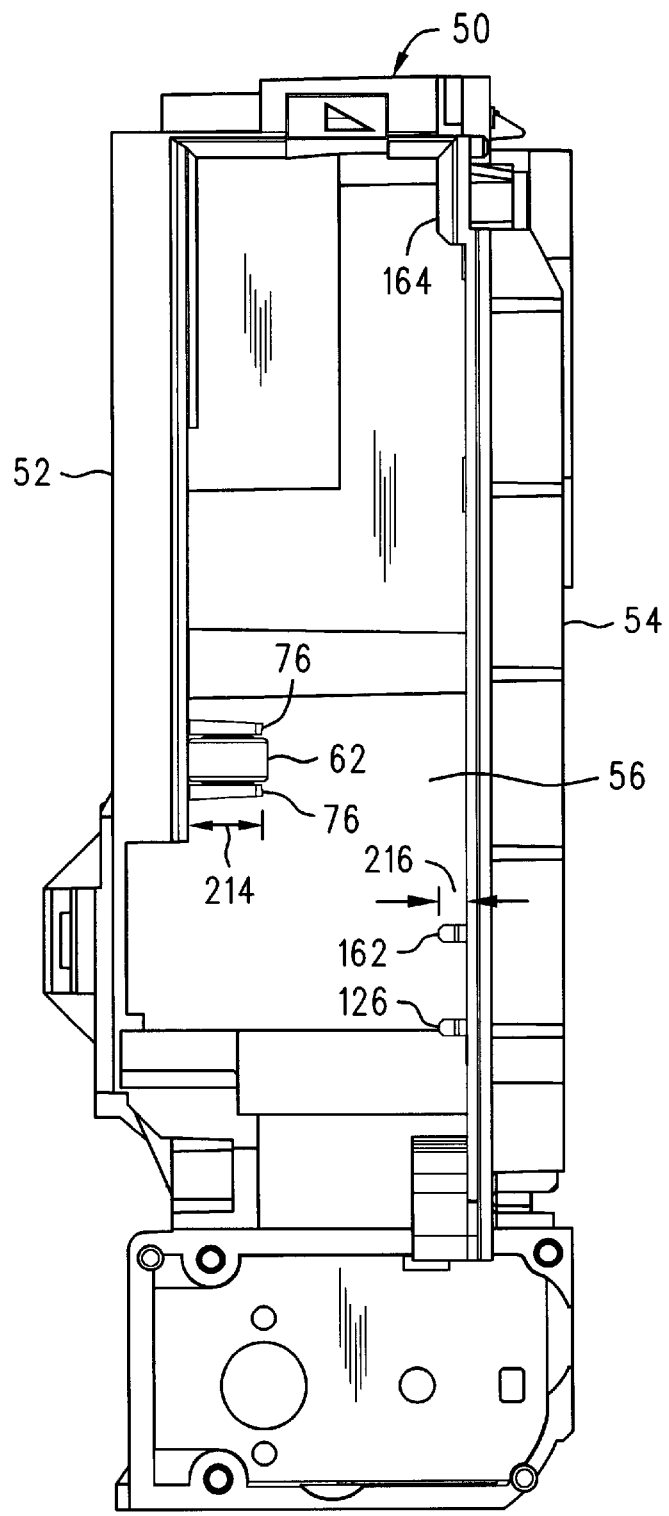
FIG. 3 is an end view of the cartridge picker assembly of FIG. 2.

The cartridge referencing spring 10 substantially aids in positioning a data cartridge 16 inside the picker 12 adjacent a cartridge receiving device 20 and 22. The roller 62 reduces wear and damage on the data cartridge 16. The roller 62 also allows varying sizes and types of media to be used, since friction between the cartridge referencing spring 10 and the data cartridge 16 is substantially eliminated and the spring tip 70 can have a relatively large height 186 to reach narrow cartridges. The cartridge referencing spring 10 may be used with varying types of media. For example, the cartridge referencing spring 10 applies a maximum load of about 2.00 pounds against a DLT cartridge. Alternatively, if a smaller Linear Tape Open (LTO) cartridge is used, the cartridge referencing spring 10 applies a maximum load of about 0.85 pounds. In a preferred embodiment, the roller 62 extends into the interior chamber 56 a distance 214 of about 9.4 mm, while the reference surface 126, 162, and 164 extend into the interior chamber 56 a distance 216 of about 3.3 mm (FIG. 3). The preferred embodiment of the cartridge referencing spring 10, having dimensions provided herein, may be used with data cartridges having a width between about 21.0 mm and about 25.4 mm.

The cartridge referencing spring 10 is adapted to a wide range of media sizes and types by the relative height of the spring tip 70 and the long slope 212 which effectively bias both thin and thick cartridges, and by the roller 62 which reduces friction on the cartridges. It should be noted that the range of acceptable media may be adjusted by varying the height of the spring tip support arms 76 and by varying the strength of the elongated elastic arm 60 comprising the leaf spring.

It is contemplated that the inventive concepts herein described may be variously otherwise embodied and it is intended that the appended claims be construed to include alternative embodiments of the invention except insofar as limited by the prior art.

What is claimed is:

1. A cartridge picker assembly, comprising:
   a frame having a first side wall and a second side wall positioned in spaced-apart relation;
   a guide surface associated with said second side wall of said frame, said guide surface being substantially parallel to said second side wall; and
   a spring assembly comprising a flexible member and a roller rotatably mounted on said flexible member and adapted to rollingly engage a cartridge mounted in said picker assembly, the flexible member mounted to said first side wall, said spring assembly having a mounting end and a cartridge biasing end, said mounting end being attached to said first side wall of said frame, and said cartridge biasing end having said roller mounted thereon, wherein said first side wall comprises an external surface facing away from said second side wall, and a rectangular opening, and wherein said mounting end of said spring assembly is attached to said external surface of said first side wall, and said cartridge biasing end of said spring assembly extends through said rectangular opening toward said guide surface, wherein said spring assembly further comprises a first wing and a second wing associated with said mounting end of said spring assembly and wider than said spring assembly at said mounting end, said assembly further comprising a plurality of mounting brackets associated with said external surface of said first side wall, each of the plurality of mounting brackets having an extension member and an overhang member arranged in 'L' shape with each of said extension members connected to said first side wall adjacent to said spring assembly, so that said first wing and second wing of said spring assembly are located between the first side wall and said overhang members to hold said mounting end of said spring against said external surface of said first side wall.

2. The cartridge picker assembly of claim 1, further comprising an elastic mounting arm formed in said first side wall so that it may be deflected toward said second side wall, said elastic mounting arm having a mounting post which extends above said external surface of said first side wall when said elastic mounting arm is not deflected, said mounting end of said spring assembly having a hole formed therein, said mounting post extending into said hole in said mounting end of said spring assembly.

* * * * *